United States Patent
Lee et al.

(10) Patent No.: US 10,333,167 B2
(45) Date of Patent: Jun. 25, 2019

(54) JIG FOR IMPROVING ADHESION BETWEEN BATTERY CELL

(71) Applicant: LG CHEM, LTD., Seoul (KR)

(72) Inventors: Tae Gyu Lee, Chungcheongbuk-Do (KR); Bum Choi, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 15/943,951

(22) Filed: Apr. 3, 2018

(65) Prior Publication Data
US 2018/0366765 A1    Dec. 20, 2018

(30) Foreign Application Priority Data

Jun. 19, 2017  (KR) .................. 10-2017-0077433

(51) Int. Cl.
| | | |
|---|---|---|
| *H01M 10/04* | (2006.01) | |
| *H01M 10/10* | (2006.01) | |
| *H01M 2/10* | (2006.01) | |
| *B23K 26/21* | (2014.01) | |
| *B23K 37/04* | (2006.01) | |
| *B23K 26/22* | (2006.01) | |
| *B23K 26/32* | (2014.01) | |
| *B23K 26/70* | (2014.01) | |
| *B23K 26/082* | (2014.01) | |
| *B23K 26/0622* | (2014.01) | |
| *B23K 26/244* | (2014.01) | |
| *B23K 26/60* | (2014.01) | |
| *B23K 101/36* | (2006.01) | |

(52) U.S. Cl.
CPC ..... *H01M 10/0404* (2013.01); *B23K 26/0622* (2015.10); *B23K 26/082* (2015.10); *B23K 26/21* (2015.10); *B23K 26/22* (2013.01); *B23K 26/244* (2015.10); *B23K 26/32* (2013.01); *B23K 26/60* (2015.10); *B23K 26/702* (2015.10); *B23K 37/0443* (2013.01); *H01M 2/1016* (2013.01); *H01M 10/0486* (2013.01); *B23K 2101/36* (2018.08)

(58) Field of Classification Search
CPC .......... H01M 2/10; H01M 2/02; H01M 10/04; B23K 26/21
See application file for complete search history.

(56) References Cited

U.S. PATENT DOCUMENTS

| | | | | |
|---|---|---|---|---|
| 2,314,788 A | * | 3/1943 | Innes ................. | B23K 37/0435 |
| | | | | 219/161 |
| 6,355,906 B1 | * | 3/2002 | Okuno ............... | B23K 26/0838 |
| | | | | 219/121.63 |
| 2016/0175978 A1 | * | 6/2016 | Lee ........................ | B23K 11/11 |
| | | | | 219/86.1 |
| 2016/0256963 A1 | * | 9/2016 | Hwang .............. | B23K 37/0443 |

FOREIGN PATENT DOCUMENTS

| | | | | |
|---|---|---|---|---|
| JP | 01-089159 A | | 4/1989 | |
| JP | 01089159 A | * | 4/1989 | ............. H01M 8/247 |
| KR | 20020008905 A | * | 2/2002 | |
| KR | 20150125387 A | * | 11/2015 | ............. B23K 26/21 |
| KR | 20160104931 A | * | 9/2016 | ............. H01M 10/04 |

* cited by examiner

*Primary Examiner* — Kenneth J Douyette
(74) *Attorney, Agent, or Firm* — Morgan, Lewis & Bockius LLP

(57) ABSTRACT

Provided are a jig of improving adhesion between a battery cell and a metal plate, which improves the adhesion between the battery cell and the metal plate of the battery pack to improve quality of laser welding and a method using the same.

5 Claims, 4 Drawing Sheets

JIG FOR IMPROVING ADHESION BETWEEN BATTERY CELL

CROSS-REFERENCE TO RELATED APPLICATION

This application claims priority to Korean Patent Application No. 10-2017-0077433 filed on Jun. 19, 2017 the disclosure of which is incorporated herein by reference in its entirety.

TECHNICAL FIELD

The present disclosure relates to a jig of improving adhesion between a battery cell and a metal plate, which improves the adhesion between the battery cell and the metal plate of the battery pack to improve quality of laser welding and a laser welding method using the same.

RELATED ART

A secondary battery having high ease of application in accordance with the product group and high electrical characteristics such as energy density is being widely applied not only to portable devices but also electric vehicles (EVs), hybrid electric vehicles (HEVs), or the like, which are driven by an electric driving source. Such a secondary battery is not only a primary advantage that the use of fossil fuels is significantly reduced, but also an additional advantage that by-products due to the use of energy are not generated at all, and thus, is attracting attention as a new energy source for enhancing environment-friendliness and energy efficiency.

Secondary batteries that are widely used in recent years include lithium ion batteries, lithium polymer batteries, nickel-cadmium batteries, nickel-metal hydride batteries, and nickel-zinc batteries. An operating voltage of a unit secondary battery cell is approximately 2.5 V to approximately 4.2 V.

Thus, when a higher output voltage is required, a plurality of secondary battery cells are connected in series to form a battery pack.

Also, a plurality of secondary battery cells are connected in parallel to form a battery pack in accordance with charging/discharging capacity required for the battery pack.

Thus, the number of secondary battery cells provided in the battery pack may be variously set in accordance with the required output voltage and charging/discharging capacity.

When the plurality of secondary battery cells are connected in series/parallel to form the battery pack, the secondary battery cells and metal plates adhere to each other and then connected through laser welding so as to electrically connect the secondary battery cells provided in the battery pack to each other.

FIG. 1 is a view illustrating a state in which battery cells 120 and metal plates 111 adhere to each other by using a pressing jig 130 and a pressing support plate 140 in accordance with the related art.

Referring to FIG. 1, although the battery cells 120 and the metal plates 111 adhere to each other by using the pressing jig 130 and the pressing support plate 140 after injecting the battery cells 120 into an upper frame 110 before the upper frame 110 and a lower frame, which constitute a battery pack, are assembled with each other, it is difficult to completely adhere between the battery cells 120 and the metal plate 111 due to shapes and a height difference of electrode terminals of the battery cells and a work tolerance.

SUMMARY

The present disclosure provides a jig of improving adhesion between a battery cell and a metal plate, which improve the adhesion between the battery cell and the metal plate of the battery pack by using magnetic force.

In accordance with an exemplary embodiment, a jig of improving adhesion between each of battery cells and a metal plate of a battery pack constituted by the plurality of battery cells includes: a main frame which has a plurality of inner spaces that are vertically defined and in which a through hole is defined upward in each of the inner spaces; a movable part provided vertically movable in each of the inner space and having a bottom surface on which a magnet is attached; a pressing part disposed on a top surface of the movable part to extend to the outside of the main frame through the through-hole and vertically movable as the movable part moves; and a magnetic force generation part spaced a predetermined distance from the bottom surface of the movable to push a magnet of the movable part through magnetic force.

The through-hole may be defined to correspond to each of the battery cells constituting the battery pack.

The pressing part may move by the magnetic force between the movable part on which the pressing part is disposed and the magnetic force generation part so that one end of the pressing part pushes a bottom surface of the battery cell through the through-hole of a lower frame of the battery pack to allow the battery cell and the metal plate of an upper frame to adhere to each other.

The magnetic force generation part may generate the magnetic force having the same polarity as that of the permanent magnet of the movable part by using an electromagnet.

Each of the movable part and the magnetic force generation part may be provided with an electromagnet, and a power supply device connected to the movable part and the magnetic force generation part to generate repulsive force therebetween may be further provided.

In accordance with another exemplary embodiment, a laser welding method between each of battery cells of a battery pack and a metal plate includes: preparing the battery pack constituted by the plurality of battery cells; locating the battery cells of the battery pack above a jig of improving adhesion between each of the battery cells and the metal plate; allowing a pressing part formed on one side of a movable part to push each of the battery cells upward by magnetic force between the movable part and a magnetic force generation part of the jig of improving the adhesion so that the battery cell of the battery pack and the metal plate adhere to each other; and performing laser welding on the metal plate and the battery cell, which are provided in an upper portion of the battery pack.

In the allowing of the battery cell and the metal plate to adhere to each other, the movable part may have one side on which a magnet is formed and the other side on which the pressing part is formed, and a magnet or an electromagnet may be disposed on a top surface of the magnetic force generation part to face the permanent magnet of the movable part and thereby to allow the pressing part to press a lower portion of each of the battery cells of the battery pack through the magnetic force between the magnetic force generation part and the movable part.

The allowing of the battery cell and the metal plate to adhere to each other may include a power supply process of supplying power to generate repulsive force between the movable part and an electromagnet disposed on the magnetic force generation part.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
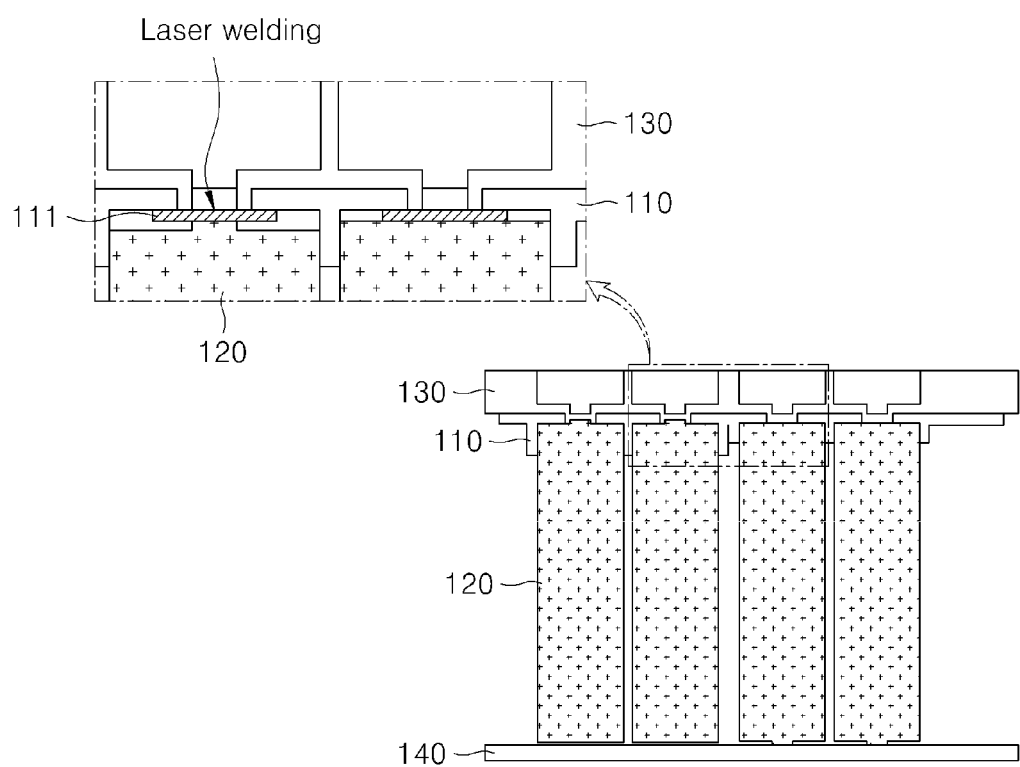
FIG. 1 is a view illustrating a state in which a battery cell and a metal plate adhere to each other by using a pressing jig and a pressing support plate in accordance with a related art.

Terms or words used in the specification and claims should not be construed as limited to a lexical meaning, and should be understood as appropriate notions by the inventor based on that he/she is able to define terms to describe his/her invention in the best way to be seen by others.

Therefore, the embodiments described in this specification and the constructions illustrated in the drawings are only preferred embodiments of the present invention, and may not describe the technical spirit thoroughly. Accordingly, it should be understood that various equivalents and modifications which can substitute the embodiments may be provided at a point of application time of this specification. Moreover, detailed descriptions related to well-known functions or configurations will be ruled out in order not to unnecessarily obscure subject matters of the present invention.

Figure 2:
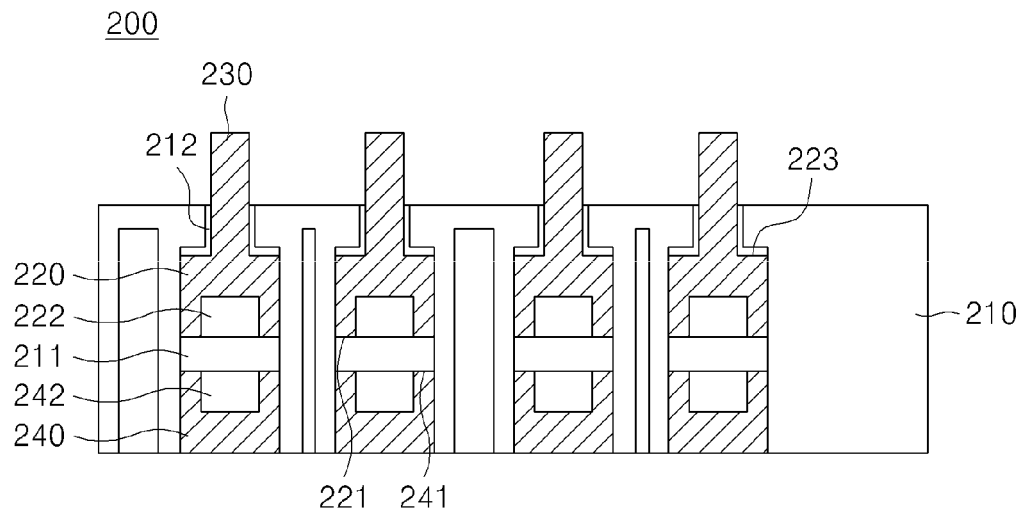
FIG. 2 is a cross-sectional view illustrating a jig of improving adhesion between a battery cell and a metal plate in accordance with an exemplary embodiment.
Figure 3:
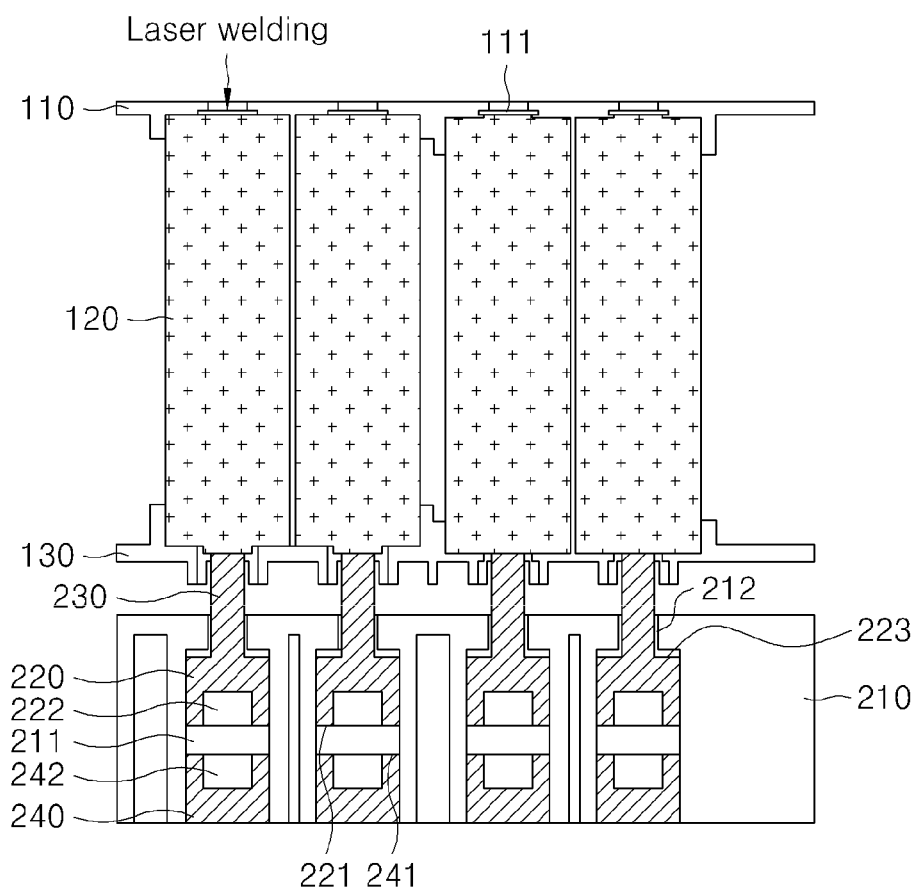
FIG. 3 is a view illustrating a state in which the battery cell and the metal plate adhere to each other by the jig of improving the adhesion between the battery cell and the metal plate in accordance with an exemplary embodiment.

FIG. 2 is a cross-sectional view illustrating a jig of improving adhesion between a battery cell and a metal plate in accordance with an exemplary embodiment, and FIG. 3 is a view illustrating a state in which the battery cell and the metal plate adhere to each other by the jig of improving the adhesion between the battery cell and the metal plate in accordance with an exemplary embodiment.

Referring to FIGS. 2 and 3, a jig 200 of improving adhesion between a battery cell and a metal plate in accordance with an exemplary embodiment may include a main frame 210, a movable part 220 to which a permanent magnet is attached, a pressing part 230, and a magnetic force generation part 240.

The main frame 210 may have a plurality of inner spaces 211 that are vertically defined, and a through-hole 212 may be defined upward in each of the inner spaces 211.

The through-hole 212 may be defined to correspond to battery cells 120 constituting a battery pack.

Thus, when the battery pack constituted by the plurality of battery cells 120 is disposed above the main frame 210, the through-hole 212 is defined in a center of a bottom surface of each of the battery cells 120.

The movable part 220 is provided vertically movable in each of the inner spaces 211, and a permanent magnet 222 is disposed on a bottom surface 221 of the movable part 220.

In this description, although the permanent magnet 222 is inserted into a recess part (not shown) defined in the bottom surface of the 221 of the movable part 220 to expose an N-pole or S-pole thereof, an exemplary embodiment is not limited thereto.

Also, the permanent magnet may be simply attached to the bottom surface 221 of the movable part 220 so that the N-pole or S-pole is directed to a lower side of the movable part 220. Also, the permanent magnet 222 may be replaced with an electromagnet.

The pressing part 230 is connected to a top surface 223 of the movable part 220 to extend to the outside of the main frame 210 through the through-hole 212. The pressing part 230 may be provided to be integrated with the movable part 220 or be provided as a separate part with respect to the movable part 220. When the pressing part 230 is provided as the separate part with respect to the movable part 220, there is an advantage that the jig is more conveniently assembled.

Also, the pressing part 230 may press the battery cells through a through-hole (not shown) of a lower frame 130 of the battery pack by the movement of the movable part 220.

The magnetic force generation part 240 is spaced a predetermined distance from the bottom surface 221 of the movable part 220 to push the permanent magnet 222 of the movable part 220 by using magnetic force.

The magnetic force generation part 240 may include a permanent magnet 242 having the same polarity as the permanent magnet 222 of the movable part 220 and facing the permanent magnet 222 of the movable part 220.

Also, although the permanent magnet 242 disposed on the magnetic force generation part 240 is inserted into a recess part (not shown) defined in the top surface of the magnetic force generation part, an exemplary embodiment is not limited thereto. For example, the permanent magnet may be simply attached to the top surface of the magnetic force generation part.

Figure 4:
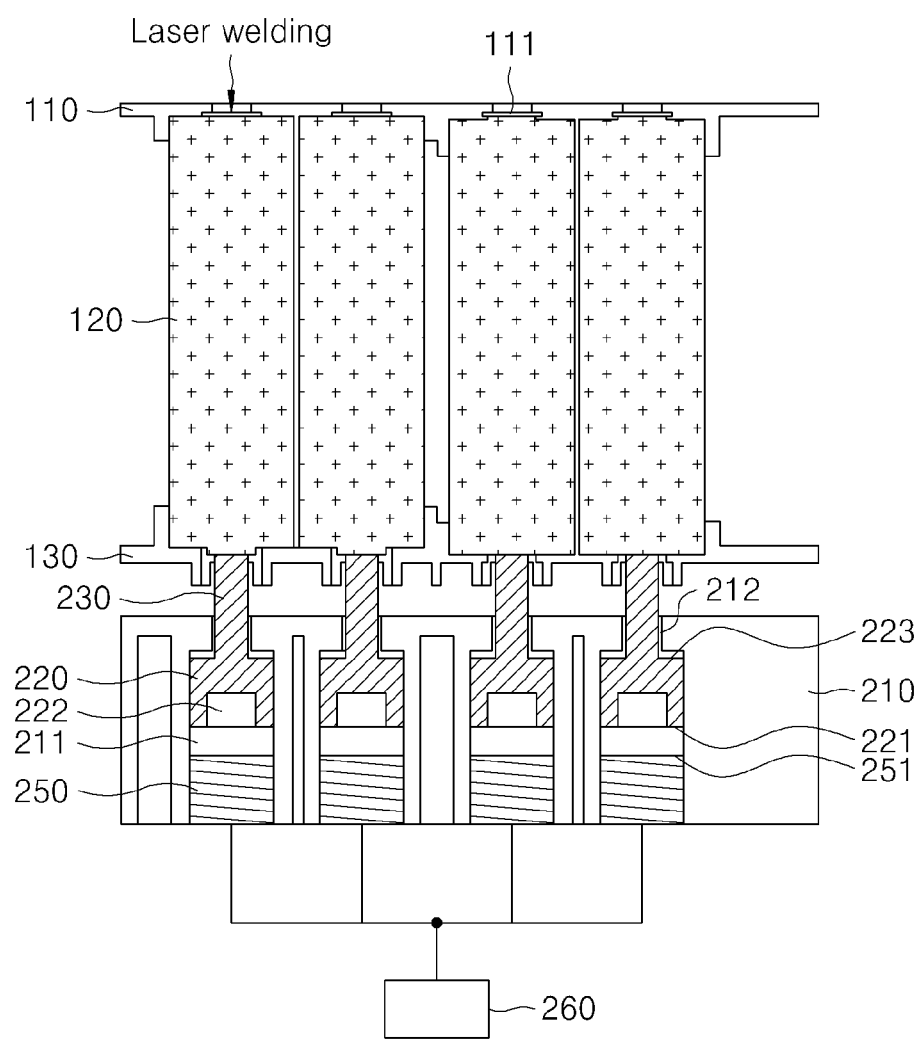
FIG. 4 is a view illustrating a jig of improving a battery cell and a metal plate, in which a magnetic force generation part is provided as an electromagnet in accordance with another embodiment.

A jig of improving adhesion between a battery cell and a metal plate in accordance with another exemplary embodiment of FIG. 4 is the same as that in accordance with the above-described exemplary embodiment except that a magnetic force generation part 250 is provided as an electromagnet, and a power supply device 260 is additionally provided, and thus other descriptions will be omitted. As described above, when the permanent magnet of the movable part is replaced with the electromagnet, the power supply device 260 may not only supply power to the electromagnet of the magnetic force generation part but also supply power to the electromagnet of the movable part.

As described above, in the jig of improving the adhesion between the battery cell and the metal plate in accordance with an exemplary embodiment, the pressing part 230 presses upward the lower portion of the battery cell 120 through the magnetic force (repulsive force) to allow the battery cell 120 and the metal plate 111 to completely adhere to each other.

Hereinafter, test results on tensile strength in accordance with the adhesion between the battery cell and the metal plate will be described.

First, explaining a manner of welding the battery cell to the metal plate, a laser welding manner of bonding the battery cell to the metal plate may be classified into a continuous wave-single (CW-single) manner (a line welding manner) and a pulse-multi manner (a spot welding manner).

The CW-single manner is a manner of linearly continuously irradiating a laser, and the pulse-multi manner is a manner of irradiating a laser to the predetermined number of spots.

Table 1 shows results of testing tensile strength between a battery cell and a metal plate by performing laser welding while changing a gap between the battery cell and the metal plate when the line welding is performed on the battery cell and the metal plate at an output of 490 W and a welding speed of 450 mm/s under the conditions in which the metal plate has a thickness of 0.15 mm, a beam size is 24 µm, and a welding shape is 2 rows (a distance of 3.5 mm).

TABLE 1

| Gap (um) | 0 | 50 | 100 |
|---|---|---|---|
| Tensile strength (kgf) | 9.6 | 8.41 | 4.1 |

Table 2 shows results of testing tensile strength between a battery cell and a metal plate by performing laser welding while changing a gap between the battery cell and the metal plate when the line welding is performed on the battery cell and the metal plate at an output of 630 W and a welding speed of 400 mm/s under the conditions in which the metal plate has a thickness of 0.2 mm, a beam size is 24 µm, and a welding shape is 2 rows (a distance of 3.5 mm).

TABLE 2

| Gap (um) | 0 | 50 | 100 |
|---|---|---|---|
| Tensile strength (kgf) | 17.63 | 15.65 | 6.6 |

Table 3 shows results of testing tensile strength between a battery cell and a metal plate by performing laser welding while changing a gap between the battery cell and the metal plate when the spot welding is performed so that 9 spots are formed by irradiating laser for pulse duration of 7 ms under the conditions in which the metal plate has a thickness of 0.2 mm, a beam size is 230 µm, and an output is 400 W.

TABLE 3

| Gap (um) | 0 | 50 | 100 | 150 | 200 |
|---|---|---|---|---|---|
| Tensile strength (kgf) | 8.28 | 8.27 | 7.37 | 7.7 | 2.05 |

Table 4 shows results of testing tensile strength between a battery cell and a metal plate by performing laser welding while changing a gap between the battery cell and the metal plate when the spot welding is performed so that 9 spots are formed by irradiating laser for pulse duration of 12 ms under the conditions in which the metal plate has a thickness of 0.2 mm, a beam size is 340 µm, and an output is 450 W.

TABLE 4

| Gap (um) | 0 | 50 | 100 | 150 | 200 |
|---|---|---|---|---|---|
| Tensile strength (kgf) | 8.36 | 8.14 | 7.42 | 7.23 | 3.83 |

Referring to Tables 1 to 4 above, it is seen that the tensile strength between the battery cell and the metal plate increases as the laser welding is performed after the gap between the battery cell and the metal plate is reduced.

As described above, in the jig of improving the adhesion between the battery cell and the metal plate in accordance with an exemplary embodiment, the pressing part 230 presses upward the lower portion of the battery cell 120 through the magnetic force (repulsive force) to allow the battery cell 120 and the metal plate 111 to completely adhere to each other.

Figure 5:
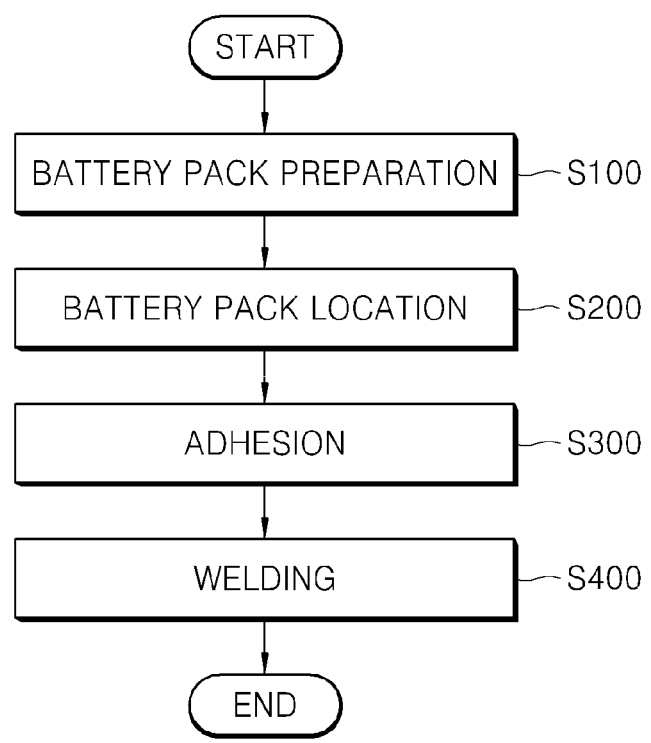
FIG. 5 is a flowchart illustrating a laser welding method between a battery cell and a metal plate of a battery pack by using laser in accordance with an exemplary embodiment.

FIG. 5 is a flowchart illustrating a laser welding method between a battery cell and a metal plate of a battery pack in accordance with an exemplary embodiment.

Referring to FIG. 5, the welding method between the battery cell and the metal plate in accordance with an exemplary embodiment may include a battery pack preparation process (S100), a battery pack location process (S200) an adhesion process (S300), and a welding process (S400) for performing laser welding.

In the battery pack preparation process (S100), a battery pack in which cylindrical battery cells are accommodated in a cell frame in rows and columns is prepared.

In the battery pack, the battery cells are accommodated between an upper frame and a lower frame, and a metal plate is disposed between the upper frame and the battery cells.

In the battery pack location process (S200), the battery pack prepared in the battery pack preparation process (S100) is disposed above a jig of improving adhesion between the battery cell and the metal plate.

Here, a pressing part of the jig of improving the adhesion between the battery cell and the metal plate is disposed to correspond to each of the battery cells, which are exposed through a plurality of through-holes of the lower frame of the battery pack.

In the adhesion process (S300), when the battery pack is disposed above the jig of improving the adhesion between the battery cell and the metal plate in the battery pack location process (S200), downward force is applied to the battery cell due to a weight of the cell frame of the battery pack.

Then, a movable part moves upward by magnetic force (repulsive force) between the movable part and a magnetic force generation part, which are provided in the jig, and a pressing part disposed at one side of the movable part pushes the battery cells upward so that the battery cell and the metal plate formed on a lower portion of the upper frame 110 of the battery pack completely adhere to each other.

Also, in the adhesion process (S300), the movable part may have one side on which a permanent magnet is formed and the other side on which the pressing part is formed. A permanent magnet or an electromagnet may be disposed on a top surface of the magnetic force generation part to face the permanent magnet of the movable part and thereby to allow the pressing part to press the lower portion of each of the battery cells of the battery pack through the magnetic force (the repulsive force) between the magnetic force generation part and the movable part.

In the adhesion process (S300), when all the movable part and the pressing part are formed as the electromagnets, a power supply process (S310) of supplying power to generate repulsive force between the electromagnets may be additionally performed.

In the welding process (S400), the laser welding may be performed in the state in which the battery cell and the metal plate completely adhere to each other by performing the laser welding on the battery cell and the metal plate, which completely adhere to each other in the adhesion process (S300), thereby improving quality of the laser welding.

In accordance with the exemplary embodiment, the battery cell and the metal plate adhere to each other without the separate pressing jig to improve the quality of the laser welding between the battery cell and the metal plate.

Although the jig of improving the adhesion between the battery cell and the metal plate of the battery pack and the laser welding method using the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A jig for improving adhesion between a metal plate and each battery cell of a plurality of battery cells of a battery pack, the jig comprising:
   a main frame having a plurality of inner spaces that are vertically defined and in which a through hole is defined upward in each of the inner spaces;
   a movable part that is vertically movable in a respective one of the inner spaces and having a bottom surface on which a magnet is attached;
   a pressing part on a top surface of the movable part to extend to the outside of the main frame through the through-hole and vertically movable as the movable part moves; and
   a magnetic force generation part spaced a predetermined distance from the bottom surface of the movable part to push the magnet of the movable part through magnetic force.

2. The jig of claim 1, wherein the through-hole of each respective inner space is defined to correspond to a respective one of the battery cells of the battery pack.

3. The jig of claim 1, wherein the pressing part moves by the magnetic force between the movable part on which the pressing part is disposed and the magnetic force generation part so that one end of the pressing part pushes a bottom surface of the battery cell through the through-hole of a lower frame of the battery pack to allow the battery cell and the metal plate of an upper frame to adhere to each other.

4. The jig of claim 1, wherein the magnetic force generation part generates the magnetic force having a same polarity as that of a permanent magnet of the movable part by using an electromagnet.

5. The jig of claim 1, wherein each of the movable part and the magnetic force generation part is provided with an electromagnet, and
   a power supply device connected to the movable part and the magnetic force generation part to generate repulsive force therebetween is further provided.

* * * * *